(12) United States Patent
Wang et al.

(10) Patent No.: US 9,794,115 B2
(45) Date of Patent: Oct. 17, 2017

(54) METHOD, DEVICE AND SYSTEM FOR AN APPLICATION LAYER TRAFFIC OPTIMIZATION SERVER

(71) Applicant: Huawei Technologies Co., Ltd., Shenzhen, Guangdong (CN)

(72) Inventors: Yang Wang, Shenzhen (CN); Yunfei Cai, Shenzhen (CN); Haibin Song, Shenzhen (CN); Ruifeng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 476 days.

(21) Appl. No.: 14/484,868

(22) Filed: Sep. 12, 2014

(65) Prior Publication Data

US 2015/0012636 A1    Jan. 8, 2015

Related U.S. Application Data

(63) Continuation of application No. PCT/CN2013/071365, filed on Feb. 5, 2013.

(30) Foreign Application Priority Data

Mar. 13, 2012    (CN) .......................... 2012 1 0065275

(51) Int. Cl.
*G06F 15/173* (2006.01)
*H04L 12/24* (2006.01)
(Continued)

(52) U.S. Cl.
CPC .......... *H04L 41/0803* (2013.01); *H04L 67/42* (2013.01); *H04L 69/16* (2013.01);
(Continued)

(58) Field of Classification Search
CPC ..... H04L 41/0803; H04L 67/42; H04L 67/28; H04L 69/16; H04L 61/1511; H04W 80/04
(Continued)

(56) References Cited

U.S. PATENT DOCUMENTS

2014/0215079 A1    7/2014 Penno et al.

FOREIGN PATENT DOCUMENTS

| CN | 1489346 A | 4/2004 |
|---|---|---|
| CN | 1509085 A | 6/2004 |

(Continued)

OTHER PUBLICATIONS

Kiesel et al. ("ALTO Server Discovery", ALTO, Internet-Draft, Sep. 14, 2011).*

(Continued)

*Primary Examiner* — Wing F Chan
*Assistant Examiner* — Joseph Maniwang
(74) *Attorney, Agent, or Firm* — Leydig, Voit & Mayer, Ltd.

(57) ABSTRACT

The present disclosure provides a discovery method, a device and a system for an application layer traffic optimization server, which relate to communication field, so as to reduce the cross-domain traffic and meet the network optimization demand of a network ISP as an internet access point. The method for an application layer traffic optimization server, related to a terminal side, comprising: obtaining a domain name of a proxy server for a terminal data layer to access internet; obtaining, according to a query name constructed using the domain name of the proxy server, an address of an application layer traffic optimization ALTO server related to the proxy server from a domain name server DNS; and communicating with the ALTO server according to the address of the ALTO server. Embodiments of the
(Continued)

present disclosure are mainly applied to the communication between the terminal and the ALTO server.

20 Claims, 8 Drawing Sheets

(51) Int. Cl.
*H04L 29/06* (2006.01)
*H04L 29/12* (2006.01)
*H04W 80/04* (2009.01)
*H04L 29/08* (2006.01)

(52) U.S. Cl.
CPC ........... *H04L 61/1511* (2013.01); *H04L 67/28* (2013.01); *H04W 80/04* (2013.01)

(58) Field of Classification Search
USPC ....................................................... 709/223
See application file for complete search history.

(56) References Cited

FOREIGN PATENT DOCUMENTS

| | | |
|---|---|---|
| CN | 101820351 A | 9/2010 |
| CN | 101964968 A | 2/2011 |
| CN | 102316091 A | 1/2012 |
| CN | 102571935 A | 7/2012 |
| CN | 103546516 A | 1/2014 |
| EP | 1522179 B1 | 10/2009 |
| WO | WO 2012010187 A1 | 1/2012 |

OTHER PUBLICATIONS

Stiemerling et al., "ALTO Deployment Considerations; draft-ietf-alto-deployments-04," ALTO Internet-Draft, pp. 1-46, The Internet Society, Reston, Virginia (Mar. 2, 2012).

Kiesel et al., "ALTO Server Discovery; draft-ietf-alto-server-discovery-03," ALTO Internet-Draft, pp. 1-27, The Internet Society, Reston, Virginia (Mar. 7, 2012).

Kiesel et al., "ALTO Server Discovery," ALTO, Internet Draft, pp. 1-25, Internet Society, Reston, Virginia (Sep. 14, 2011).

* cited by examiner

METHOD, DEVICE AND SYSTEM FOR AN APPLICATION LAYER TRAFFIC OPTIMIZATION SERVER

CROSS-REFERENCE TO RELATED APPLICATIONS

The application is a continuation of International Patent Application No. PCT/CN2013/071365, filed on Feb. 5, 2013, which claims the priority to Chinese Patent Application No. 201210065275.4, filed on Mar. 13, 2012, both of which are hereby incorporated by reference in their entireties.

FIELD OF THE INVENTION

The present disclosure relates to communication field, and particularly, to a discovery method, a device and a system for an application layer traffic optimization server.

BACKGROUND OF THE INVENTION

An ALTO (Application Layer Traffic Optimization, application layer traffic optimization) technology is used for providing network topology information for a provider which provides network optimization service to guide a user to access the closest resource, so as to reduce network traffic and improve access quality of the user.

In existing ALTO technology, no matter a terminal is in a home network or a foreign network, an ALTO server is discovered through an IP (Internet Protocol, internet protocol) address of the terminal.

Inventors discover that the existing technology at least has the following problem.

If a terminal data layer accesses internet through a home agent (Home Agent, HOA) of the home network and the terminal obtains the ALTO server related to a visiting agent, or if the terminal data layer accesses the internet through a foreign agent (Foreign Agent, FOA) of a foreign network and the terminal obtains the ALTO server related to a home agent, a proxy server for the terminal data layer to access the internet is not matched with the ALTO server, so that more cross-domain traffic is produced. Moreover, the ALTO server obtained by the terminal is not the one related to the proxy server for the terminal data layer to access the internet, so that the network optimization demand of a network ISP (Internet Service Provider, internet service provider) as an internet access point cannot be met well, and usage demand of a terminal user cannot be met well either.

SUMMARY OF THE INVENTION

The embodiments of the present disclosure provide a discovery method, a device and a system for an application layer traffic optimization server, which reduce cross-domain traffic and meet the network optimization demand of a network ISP as an internet access point.

In order to achieve the above-mentioned objective, the embodiments of the present disclosure adopt following technical solutions.

In one aspect, a discovery method for an application layer traffic optimization server is provided, comprising:
 obtaining a domain name of a proxy server for a terminal data layer to access internet;
 obtaining, according to a query name constructed using the domain name of the proxy server, an address of an application layer traffic optimization (ALTO) server related to the proxy server from a domain name server (DNS); and
 communicating with the ALTO server according to the address of the ALTO server.

In one aspect, a discovery method for an application layer traffic optimization server is provided, comprising:
 receiving a U-NAPTR request sent by a terminal, wherein the U-NAPTR request comprises a query name constructed using a domain name of a proxy server for a terminal data layer to access internet; and
 returning an address of an ALTO server related to the proxy server to the terminal, for the terminal to communicate with the ALTO server according to the address of the ALTO server.

In another aspect, a terminal is provided, comprising:
 a proxy-domain-name obtaining unit, configured to obtain a domain name of a proxy server for a terminal data layer to access internet;
 an address obtaining unit, configured to obtain, according to a query name constructed using the domain name of the proxy server, an address of an application layer traffic optimization ALTO server related to the proxy server from a domain name server DNS; and
 a communicating unit, configured to communicate with the ALTO server according to the address of the ALTO server.

In another aspect, a DNS server is provided, comprising:
 a U-NAPTR request receiving unit, configured to receive a U-NAPTR request sent by a terminal, wherein the U-NAPTR request comprises a query name constructed using a domain name of a proxy server for a terminal data layer to access internet; and
 an address returning unit, configured to return an address of an ALTO server related to the proxy server to the terminal, for the terminal to communicate with the ALTO server according to the address of the ALTO server.

In another aspect, a discovery system for an application layer traffic optimization server is provided, comprising:
 the above-mentioned terminal and DNS server.

In the discovery method, device and system for the application layer traffic optimization server provided in the embodiments of the present disclosure, the terminal communicates with the ALTO server according to the address of the ALTO server by obtaining the domain name of the proxy server for the terminal data layer to access internet and requesting the DNS server for an address of the ALTO server according to a query name constructed using the domain name of the proxy server, so as to avoid the condition that the ALTO server obtained by the terminal is not the one related to the proxy server of the terminal data layer accessing the internet, thus reducing the cross-domain traffic and facilitating the network optimization demand of a network ISP as an internet access point.

BRIEF DESCRIPTION OF THE DRAWINGS

To illustrate technical solutions of the embodiments of the present disclosure or the related art more clearly, a brief introduction on the accompanying drawings necessary in the description of the embodiments or the related art is given below. Apparently, the accompanying drawings described below are merely some embodiments of the present disclosure, based on which other drawings can be obtained by those skilled in the art without any inventive efforts.

EMBODIMENTS OF THE INVENTION

In order to make objectives, technical solutions and advantages of the embodiments of the present disclosure more clearly, a clear and complete description of technical solutions of the embodiments of the present disclosure will be given below, in combination with the accompanying drawings in the embodiments of the present disclosure. Apparently, the embodiments described below are merely a part, but not all, of the embodiments of the present disclosure. All of other embodiments, obtained by those skilled in the art based on the embodiments of the present disclosure without any inventive efforts, fall into the protection scope of the present disclosure.

Figure 1:
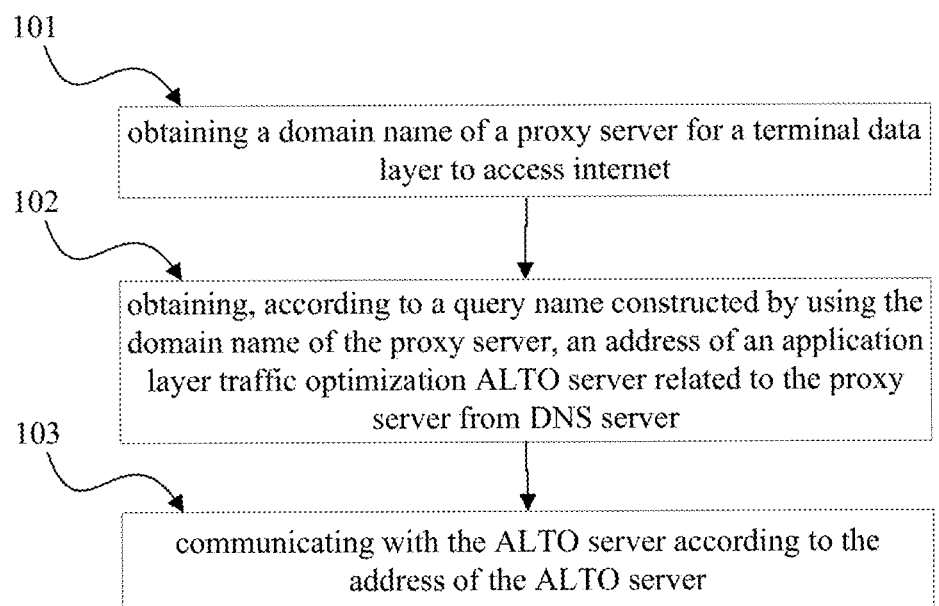
FIG. 1 is a flowchart of a discovery method for an application layer traffic optimization server provided by the embodiments of the present disclosure.

A discovery method for an application layer traffic optimization server is provided by the embodiments of the present disclosure, which is related to a terminal side. As shown in FIG. 1, the method comprises:

101, obtaining a domain name of a proxy server for a terminal data layer to access internet.

A user may access an ALTO server in a cross-network moving or roaming state by means of a mobile IP technology. The usage scenario of the mobile IP technology includes a tunnel mode and a routing optimization mode.

Figure 2A:
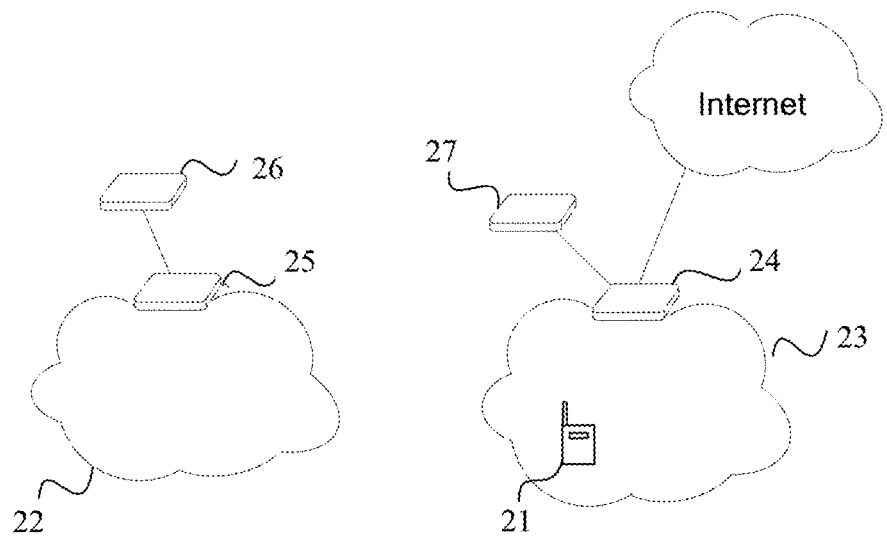
FIG. 2a is a schematic scene diagram of the embodiments of the present disclosure applied to a mobile IP routing optimization mode.

In one condition, when a terminal moves from a home network to a foreign network, if data transmission is performed by the routing optimization mode, the proxy server, for the terminal data layer to accesses the internet, will be located in a foreign agent of the current foreign network where the terminal is located, rather than a home agent in the home network. Data sending or receiving between the terminal and the internet is transferred directly through the foreign agent. As shown in FIG. 2a, an terminal 21 has moved from an home network 22 to an foreign network 23, and in the routing optimization mode, the terminal 21 will access the internet through an foreign agent 24, rather than an home agent 25. The ALTO server related to the home agent 25 is an ALTO server 26, and the ALTO server related to the foreign agent 24 is an ALTO server 27. The terminal 21 keeps the original IP address at the home network 22 in the routing optimization mode; and if the ALTO server is discovered according to a method in the prior art, the terminal 21 obtains the domain name of the ALTO server 26 related to the home agent 25 according to its own IP address. The correlation between the ALTO server 26 and the foreign agent 24 is lower than that between the ALTO server 27 and the foreign agent 24. Under this condition, if the terminal uses the ALTO server 27, the cross-domain traffic may be reduced, and it is beneficial to meet the network optimization demand of a foreign network operator. Therefore, the terminal needs to first obtain the domain name of the foreign agent as the proxy server for the terminal data layer to access the internet.

Figure 2B:
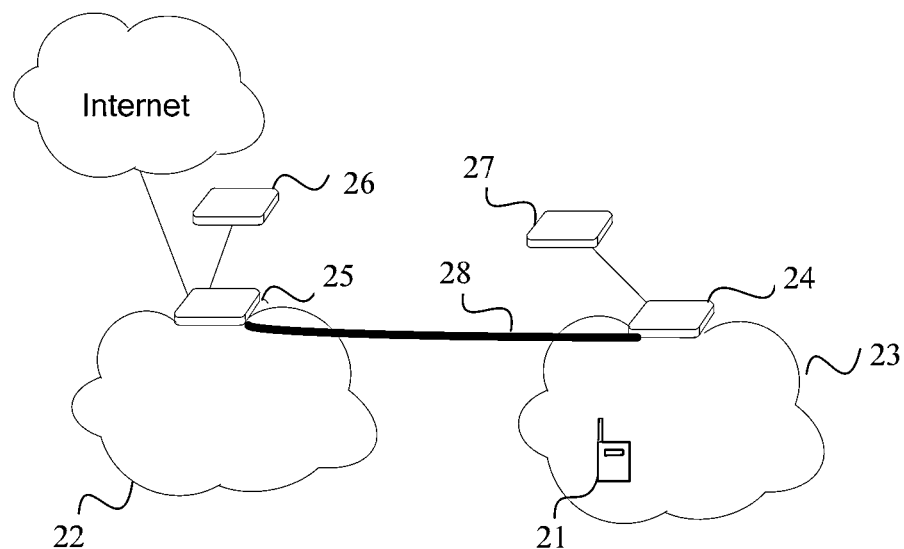
FIG. 2b is a schematic scene diagram of the embodiments of the present disclosure applied to a mobile IP tunnel mode.

In another condition, when the terminal moves from the home network to the foreign network, if data transmission is performed by the tunnel mode, the proxy server, for the terminal data layer to accesses the internet, will be located in the home agent of the home network, the home network still controls service of the terminal under this condition, and the foreign network performs dynamic IP address allocation for the terminal. Although the allocation of the dynamic IP address is performed in the foreign network, the process of the dynamic IP address allocation is still controlled by the home agent. At this point, data sent from the terminal to the internet is transmitted to the internet through the foreign agent, a tunnel and the home agent; and data sent from the internet to the terminal is transmitted to the terminal through the home agent, the tunnel and the foreign agent. As shown in FIG. 2b, the terminal 21 has moved from the home network 22 to the foreign network 23, and the terminal 21 accesses the Internet through the home agent 25. The ALTO server related to the home agent 25 is an ALTO server 26, and the ALTO server related to the foreign agent 24 is an ALTO server 27. A tunnel 28 is set between the home agent 25 and the foreign agent 24. The terminal 21 obtains the IP address dynamically allocated by the foreign network 23 in the tunnel mode; and if the ALTO server is discovered according to a method in the prior art, the terminal 21 obtains the domain name of the ALTO server 27 related to the foreign agent 24 according to its own IP address. The correlation between the ALTO server 27 and the home agent 25 is lower than that between the ALTO server 26 and the home agent 25. Under this condition, if the terminal uses the ALTO server 26, the cross-domain traffic may be reduced, and it is beneficial to meet the network optimization demand of a home network operator. Therefore, the terminal needs to first obtain the domain name of the home agent as the proxy server for the terminal data layer to access the internet.

Figure 2C:
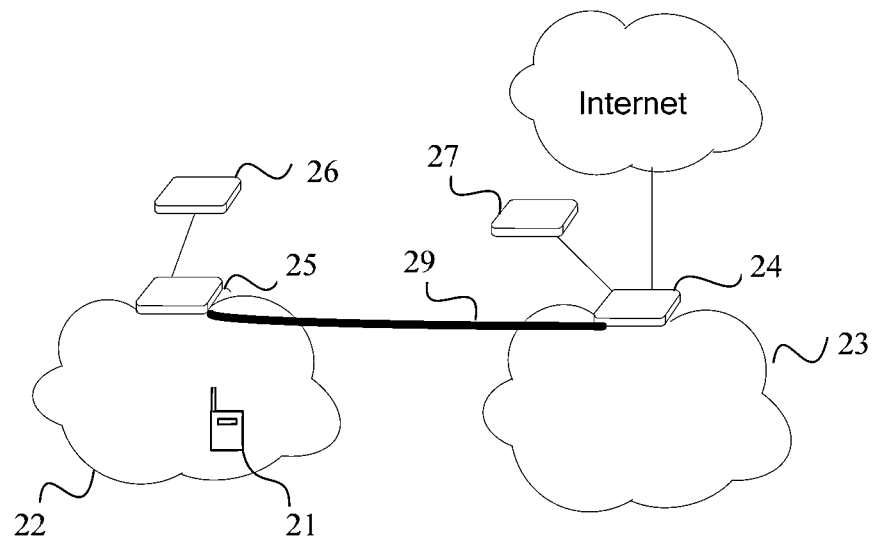
FIG. 2c is another schematic scene diagram of the embodiments of the present disclosure applied to a VPN mode.

In another condition, the terminal may access the Internet by adopting a VPN (Virtual Private Network, virtual private network) technology, and a VPN tunnel is set between the network where the terminal is located and a network connected to the internet side under this condition, as shown in FIG. 2c. The terminal 21 is located in the network 22, a VPN tunnel 29 is set between the agent 25 and the agent 24 of the network 23, and the terminal accesses the internet through the agent 25, the VPN tunnel 29 and the agent 24. The ALTO server related to the agent 25 is an ALTO server 26, and the ALTO server related to the agent 24 is an ALTO server 27. If the terminal uses the ALTO server 27, the cross-domain traffic may be reduced, and it is beneficial to meet the network optimization demand of a network provider accessing the internet side. Therefore, the terminal needs to first obtain the domain name of the proxy server for the terminal data layer to access the internet.

102, obtaining, according to a query name constructed using the domain name of the proxy server, an address of an application layer traffic optimization ALTO server related to the proxy server from DNS server.

The address of the ALTO server, returned by the DNS server, may be a uniform resource identifier (Uniform Resource Identifier, URI for short) or IP address. For the URI address returned by the DNS server, it finally needs to be converted into the corresponding IP address by the DNS server. After the terminal obtains the IP address of the ALTO server, the terminal may communicate with the ALTO server related to the proxy server according to the IP address of the ALTO server.

The proxy server is the home agent of the home network, or the foreign agent of the foreign network, or a proxy server for a VPN to access the internet. In the tunnel mode of the mobile IP technology, the proxy server is the home agent of the home network; in the routing optimization mode, the proxy server is the foreign agent of the foreign network; and in the VPN mode, the proxy server is the one of the internet access network.

103, communicating with the ALTO server according to the address of the ALTO server.

Figure 3:
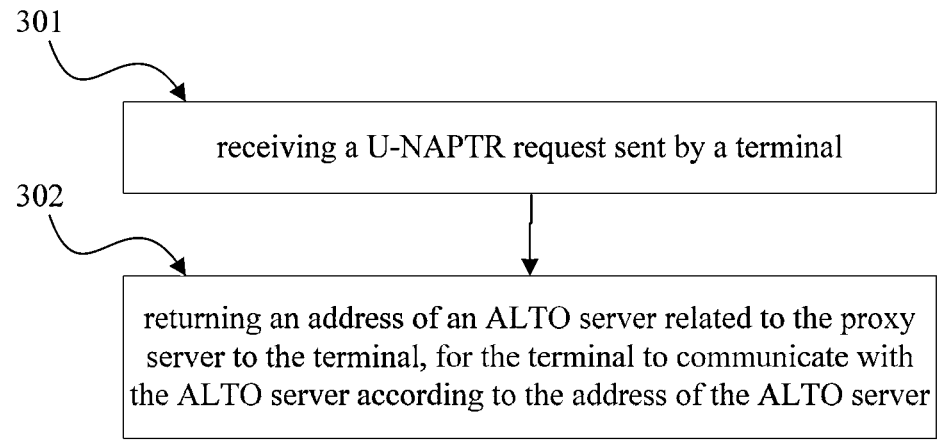
FIG. 3 is a flowchart of another discovery method for an application layer traffic optimization server provided by the embodiments of the present disclosure.

Another discovery method for an application layer traffic optimization server is provided by the embodiments of the present disclosure, which refers to the DNS server side. As shown in FIG. 3, the method comprises:

301, receiving a U-NAPTR request sent by a terminal.

The U-NAPTR request comprises a query name constructed using a domain name of a proxy server for a terminal data layer to access internet.

302, returning an address of an ALTO server related to the proxy server to the terminal, for the terminal to communicate with the ALTO server according to the address of the ALTO server.

The address of the ALTO server, returned by the DNS server, may be a URI or IP address. For the URI address returned by the DNS, it finally needs to be converted into the corresponding IP address by the DNS server, enabling the terminal to communicate with the ALTO server according to the IP address of the ALTO server.

In the discovery method for the application layer traffic optimization server provided in the embodiments of the present disclosure, the terminal communicates with the ALTO server according to the address of the ALTO server by obtaining the domain name of the proxy server for the terminal data layer to access internet and requesting the DNS server for an address of the ALTO server according to a query name constructed using the domain name of the proxy server, so as to avoid the condition that the ALTO server obtained by the terminal is not the one related to the proxy server of the terminal data layer accessing the internet, thus reducing the cross-domain traffic and facilitating the network optimization demand of an ISP.

Further, when the terminal moves from a home network to a foreign network, if data transmission is performed by the routing optimization mode, the terminal data layer accesses the internet through a foreign agent of the current foreign network, rather than a home agent in the home network, as shown in FIG. 2a. Under this condition, if the terminal uses the ALTO server related to the foreign agent, the cross-domain traffic may be reduced, and it is beneficial to meet the network optimization demand of a foreign network provider. Therefore, the terminal needs to obtain the domain name of the foreign agent of the foreign network thereof, and obtains the address of the ALTO server related to the foreign agent according to the domain name of the foreign agent of the foreign network.

Figure 4:
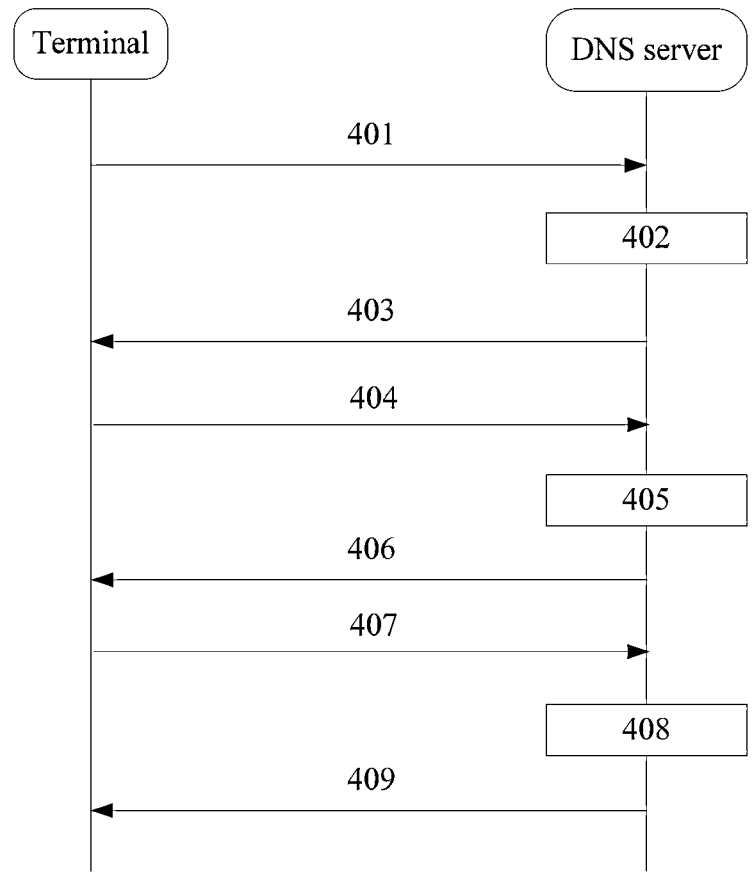
FIG. 4 is a flowchart of another discovery method for an application layer traffic optimization server provided by the embodiments of the present disclosure.

The embodiments of the present disclosure also provide a discovery method for an application layer traffic optimization server, which is used in a scenario that a proxy server for a terminal data layer to access the internet is a foreign agent. As shown in FIG. 4, the method comprises:

401, a reverse resolution request is initiated to a DNS by the terminal.

The reverse resolution request comprises the IP address of a foreign agent of a foreign network where the terminal is located, enabling the DNS server to find the domain name of the foreign agent according to the received IP address of the foreign agent.

402, the domain name of the foreign agent is found according to the IP address of the foreign agent.

After the DNS server receives the reverse resolution request, the DNS server finds the domain name of the foreign agent corresponding to the IP address according to the IP address carried in the reverse resolution request.

403, the domain name of the foreign agent is returned to the terminal by the DNS server.

In the actual scenario, after the terminal enters the foreign network, the terminal may obtain the domain name of the foreign agent, at this point, the above-mentioned steps 401 to 403 do not need to be executed, and step 404 may be directly executed.

404, a U-NAPTR (URL-Enabled Naming Authority Pointer, URL-enabled naming authority pointer) request is initiated to the DNS server according to a query name constructed using the domain name of the foreign agent.

In actual application, before step 404 is executed, the terminal may judge whether the proxy server for the terminal data layer to access the internet is the foreign agent or not, and if so, step 404 is executed.

After the terminal receives the domain name of the foreign agent returned by the DNS server, the terminal initiates the U-NAPTR request to the DNS server, wherein the U-NAPTR request carries the query name constructed using the domain name of the foreign agent, so as to request the DNS server to return the domain name of an ALTO server related to the foreign agent to the terminal.

405, the domain name of the ALTO server related to the foreign agent is found by the DNS server.

406, the domain name of the ALTO server related to the foreign agent is returned to the terminal by the DNS server.

407, a forward resolution request is initiated to the DNS server.

The forward resolution request initiated by the terminal comprises the domain name of the ALTO server related to the foreign agent, which is returned by the DNS server.

408, the address of the ALTO server related to the foreign agent is found by the DNS server according to the domain name of the ALTO server related to the foreign agent.

In the DNS server, the corresponding address of the ALTO server related to the foreign agent may be found according to the domain name of the ALTO server related to the foreign agent.

409, the address of the ALTO server related to the foreign agent is returned to the terminal.

After the address of the ALTO server is returned, the terminal may communicate with the ALTO server according to the address of the ALTO server.

The address of the ALTO server, returned by the DNS server, may be a URI or IP address. For the URI address returned by the DNS server, it finally needs to be converted into the corresponding IP address by the DNS server, so that the terminal communicates with the ALTO server according to the IP address of the ALTO server. After the terminal receives the IP address of the ALTO server related to the foreign agent returned by the DNS, the terminal may communicate with the ALTO server related to the foreign agent according to the IP address.

Figure 15:
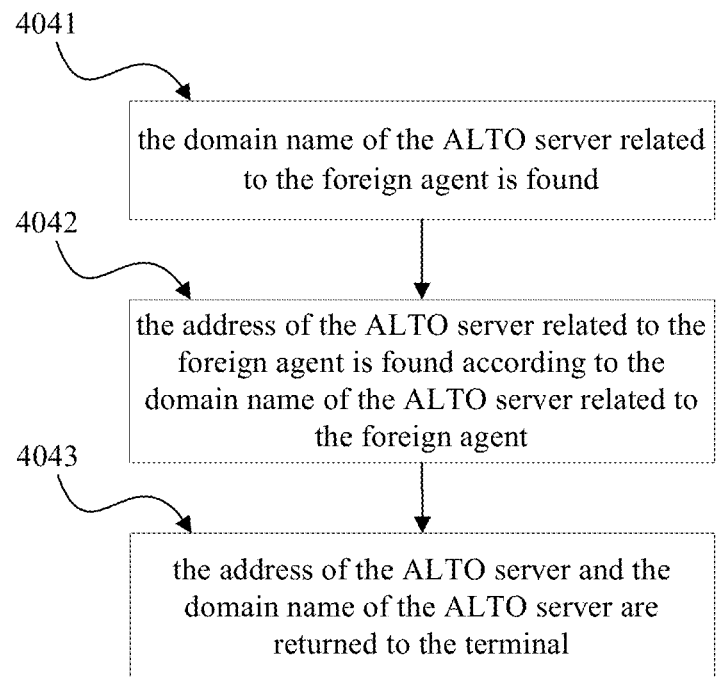
FIG. 15 is a flowchart of another discovery method for an application layer traffic optimization server provided by the embodiments of the present disclosure.

A method for discovering the ALTO server is given from 401 to 409. Alternatively, after 404, the ALTO server may also be discovered through 4041 to 4043 below, as shown in FIG. 15.

4041, the domain name of the ALTO server related to the foreign agent is found.

After the terminal initiates the U-NAPTR request to the DNS server in step 404, the DNS server first finds the domain name of the ALTO server related to that of the foreign agent of the terminal.

4042, the address of the ALTO server related to the foreign agent is found according to the domain name of the ALTO server related to the foreign agent.

4043, the address of the ALTO server and the domain name of the ALTO server are returned to the terminal.

Through step 4043, the terminal may receive the domain name of the ALTO server returned by the DNS and receive the address returned along with the domain name of the ALTO server at the same time, so as to reduce a process step.

The address of the ALTO server, returned by the DNS server, may be a URI or IP address. For the URI address returned by the DNS server, it finally needs to be converted into the corresponding IP address by the DNS server, so that the terminal communicates with the ALTO server according to the IP address of the ALTO server. Hereafter, the terminal may communicate with the ALTO server related to the foreign agent according to the IP address of the ALTO server.

In the discovery method for the application layer traffic optimization server provided in the embodiments of the present disclosure, the terminal may communicate with the ALTO server related to the foreign agent by obtaining the domain name of the foreign agent of the foreign network where the terminal is located and requesting the DNS server for the address of the ALTO server related to the foreign agent according to the domain name of the foreign agent, so that the terminal is prevented from accessing the ALTO server related to the home agent under the condition that the terminal is connected with the internet through the foreign agent, thus reducing the cross-domain traffic and facilitating the network optimization demand of the foreign network.

Further, when the terminal moves from the home network to the foreign network, if a tunnel is established between the home agent and the foreign agent and the home agent is used as the proxy server for the terminal data layer to access the internet to transmit data, and under this condition, as shown in FIG. 2b, if the terminal uses the ALTO server related to the home agent, the cross-domain traffic may be reduced, and it is beneficial to meet the network optimization demand of a home network operator. Therefore, the terminal needs to obtain the domain name of the home agent of the home network and obtain the address of the ALTO server related to the home agent according to the domain name of the home agent of the home network.

Figure 5:
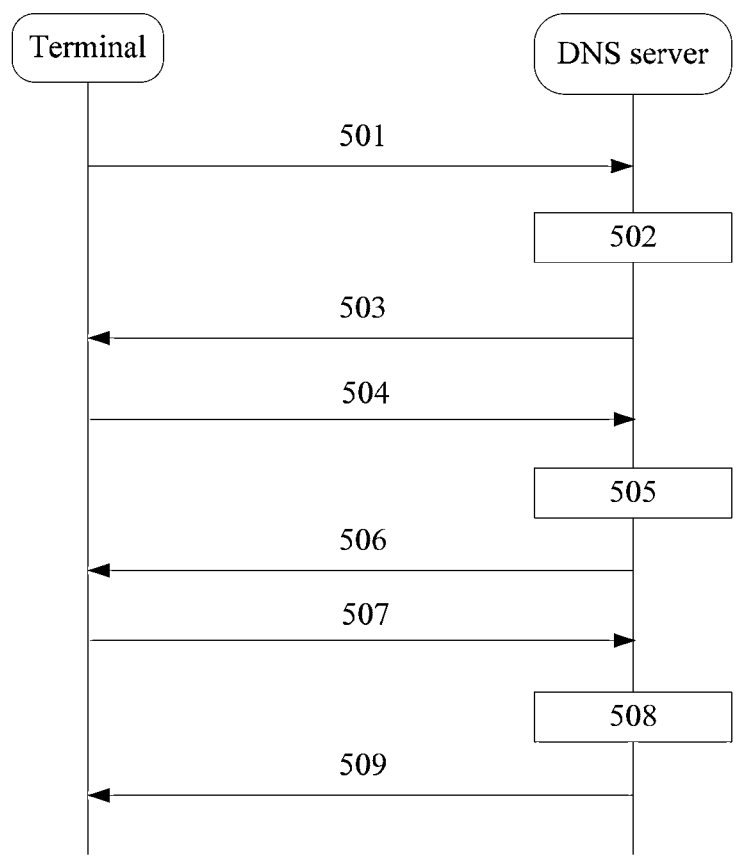
FIG. 5 is a flowchart of another discovery method for an application layer traffic optimization server provided by the embodiments of the present disclosure.

The embodiments of the present disclosure provide a discovery method for an application layer traffic optimization server, which is used in a scenario that a proxy server for a terminal data layer to access the internet is a home agent. As shown in FIG. 5, the method comprises:

501, a reverse resolution request is initiated to a DNS by a terminal.

The reverse resolution request comprises the IP address of a home agent of a home network, enabling the DNS server to find the domain name of the home agent according to the received IP address of the home agent.

Tunnel modes in the embodiment of the present disclosure include IPv4 and IPv6 tunnel modes; after downlink data of the internet is transmitted to the home agent, the downlink data is sent to a foreign agent through an IPv4 or IPv6 tunnel and transmitted to the terminal by the foreign agent; and on the other hand, uplink data of the terminal is first sent to the foreign agent and transmitted to the internet through the foreign agent, the IPv4 or IPv6 tunnel and the home agent.

502, the domain name of the home agent is found according to the IP address of the home agent.

After the DNS server receives the reverse resolution request, the DNS server finds the domain name of the home agent corresponding to the IP address according to the IP address carried in the reverse resolution request.

503, the domain name of the home agent is returned to the terminal by the DNS.

In the actual scenario, the terminal may hold the domain name of the home agent, at this point, the above-mentioned steps 501 to 503 do not need to be executed, and step 504 may be directly executed.

504, a U-NAPTR request is initiated to the DNS server according to a query name constructed using the domain name of the home agent.

In actual application, before step 504 is executed, the terminal may judge whether the proxy server for the terminal data layer to access the internet is the home agent or not, and if so, step 504 is executed.

After the terminal receives the domain name of the home agent returned by the DNS server, the terminal initiates the U-NAPTR request to the DNS server, wherein the U-NAPTR request carries the query name constructed using the domain name of the home agent, so as to request the DNS server to return the domain name of an ALTO server related to the home agent to the terminal.

505, the domain name of the ALTO server related to the home agent is found by the DNS server.

506, the domain name of the ALTO server related to the home agent is returned to the terminal by the DNS server.

507, a forward resolution request is initiated to the DNS server.

The forward resolution request initiated by the terminal carries the domain name of the ALTO server related to the home agent, which is returned by the DNS server.

508, the address of the ALTO server related to the home agent is found by the DNS server according to the domain name of the ALTO server related to the home agent.

In the DNS server, the corresponding address of the ALTO server related to the home agent may be found according to the domain name of the ALTO server related to the home agent.

509, the address of the ALTO server related to the home agent is returned to the terminal.

The address of the ALTO server, returned by the DNS server, may be a URI or IP address. For the URI address returned by the DNS server, it finally needs to be converted into the corresponding IP address by the DNS server. After the terminal receives the IP address of the ALTO server related to the home agent returned by the DNS, the terminal may communicate with the ALTO server related to the home agent according to the IP address.

Figure 16:
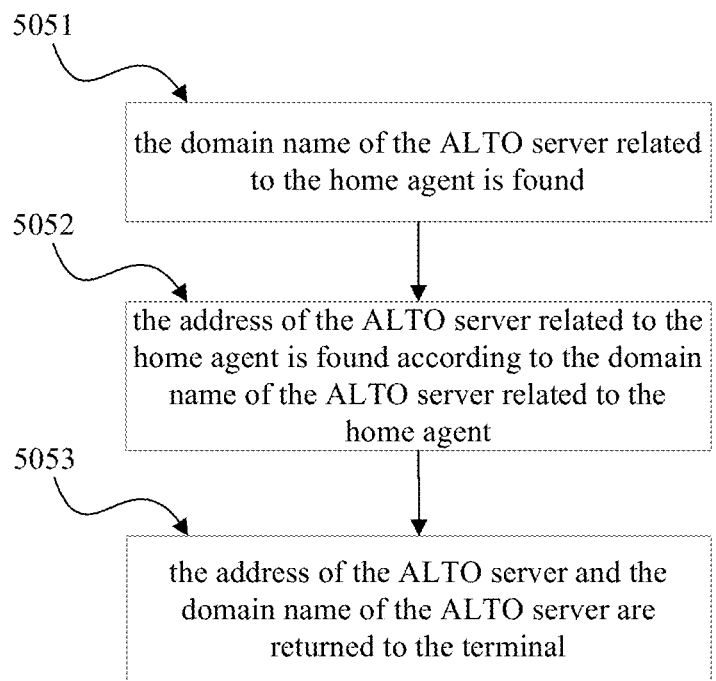
FIG. 16 is a flowchart of another discovery method for an application layer traffic optimization server provided by the embodiments of the present disclosure.

A method for discovering the ALTO server is given from 501 to 509. Alternatively, after 504, the ALTO server may also be discovered through 5051 to 5053 below, as shown in FIG. 16.

5051, the domain name of the ALTO server related to the home agent is found.

After the terminal initiates the U-NAPTR request to the DNS server in step 504, the DNS server first finds the domain name of the ALTO server related to that of the home agent of the terminal.

5052, the address of the ALTO server related to the home agent is found according to the domain name of the ALTO server related to the home agent.

5053, the address of the ALTO server and the domain name of the ALTO server are returned to the terminal.

Through step 5053, the terminal may receive the domain name of the ALTO server returned by the DNS and receive the address returned along with the domain name of the ALTO server at the same time, so as to reduce a process step.

The address of the ALTO server, returned by the DNS server, may be a URI or IP address. For the URI address returned by the DNS server, it finally needs to be converted into the corresponding IP address by the DNS server. Hereafter, the terminal may communicate with the ALTO server related to the home agent according to the IP address of the ALTO server.

Moreover, the above-mentioned embodiment of the present disclosure may also be applied to the proxy server of an internet access layer discovered in a VPN scenario, which will not be described redundantly herein.

In the discovery method for the application layer traffic optimization server provided in the embodiments of the present disclosure, the terminal may communicate with the ALTO server related to the home agent by obtaining the domain name of the home agent of the home network and requesting the DNS for the address of the ALTO server related to the home agent according to the domain name of the home agent, so that the terminal is prevented from accessing the ALTO server related to the foreign agent under the condition that the terminal is connected with the Internet through the home agent, thus reducing the cross-domain traffic and facilitating the network optimization demand of the foreign network.

Figure 6:
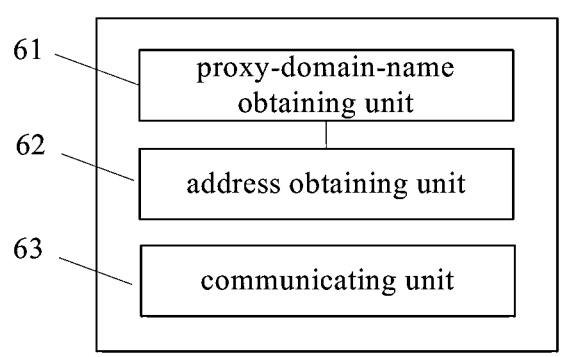
FIG. 6 is a block diagram of a terminal provided by the embodiments of the present disclosure.

The embodiments of the present disclosure provide a terminal. As shown in FIG. 6, the terminal comprises a proxy-domain-name obtaining unit 61, an address obtaining unit 62 and a communicating unit 63.

The proxy-domain-name obtaining unit 61 is configured to obtain a domain name of a proxy server for a terminal data layer to access internet.

The address obtaining unit 62, configured to obtain, according to a query name constructed using the domain name of the proxy server, an address of an application layer traffic optimization ALTO server related to the proxy server from a domain name server DNS server.

The communication unit 63 is configured to communicate with the ALTO server according to the address of the ALTO server.

The address of the ALTO server, returned by the DNS server, may be a URI or IP address. For the URI address returned by the DNS server, it finally needs to be converted into the corresponding IP address by the DNS server, so that the terminal may communicate with the ALTO server according to the IP address of the ALTO server.

Figure 7:
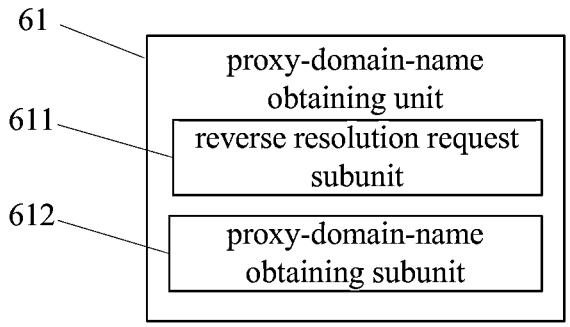
FIG. 7 is a block diagram of a proxy-domain-name obtaining unit of the embodiments of the present disclosure.

As shown in FIG. 7, the proxy-domain-name obtaining unit 61 specifically comprises a reverse resolution request subunit 611 and a proxy-domain-name obtaining subunit 612.

The reverse resolution request subunit 611 is configured to initiate a reverse resolution request to the DNS, the reverse resolution request comprising an IP address of the proxy server, for the DNS server to find the domain name of the proxy server according to the IP address of the proxy server.

The proxy-domain-name obtaining subunit 612 is configured to receive the domain name of the proxy server returned by the DNS server.

Figure 8:
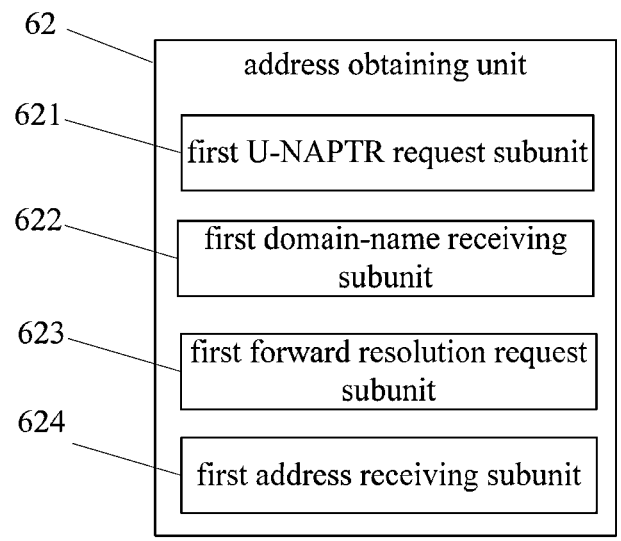
FIG. 8 is a block diagram of an address obtaining unit of the embodiments of the present disclosure.

Moreover, as shown in FIG. 8, the address obtaining unit 62 specifically includes a first U-NAPTR request subunit 621, a first domain-name receiving subunit 622, a first forward resolution request subunit 623 and a first address receiving subunit 624.

The first U-NAPTR request subunit 621 is configured to initiate, according to the query name constructed using the domain name of the proxy server, a U-NAPTR request to the DNS server, for the DNS server to find a domain name of the ALTO server related to the proxy server according to the domain name of the proxy server.

The first domain-name receiving subunit 622 is configured to receive the domain name of the ALTO server related to the proxy server, which is returned by the DNS server.

The first forward resolution request subunit 623 is configured to initiate a forward resolution request to the DNS server, the forward resolution request comprising the domain name of the ALTO server, for the DNS server to find the address of the ALTO server according to the domain name of the ALTO server; and The first address receiving subunit 624 is configured to receive the address of the ALTO server returned by the DNS server.

Figure 9:
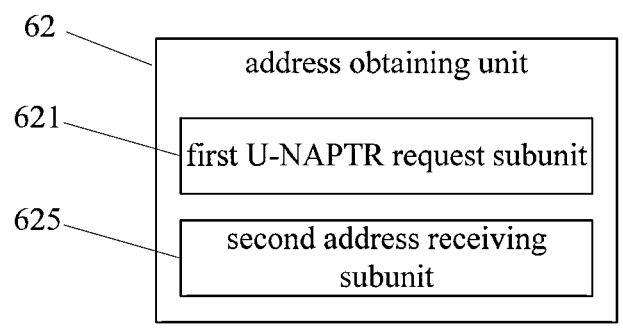
FIG. 9 is a block diagram of another address obtaining unit of the embodiments of the present disclosure.

Further, as shown in FIG. 9, the address obtaining unit 62 specifically comprises a first U-NAPTR request subunit 621 and a second address receiving subunit 625.

The second address receiving subunit 625 is configured to receive the domain name of the ALTO server and address of the ALTO server returned by the DNS server.

The proxy server in the embodiment of the present disclosure may be a home agent of a home network, or a foreign agent of a foreign network, or a proxy server for a VPN to access the internet.

When the terminal moves from the home network to the foreign network, if the data transmission is performed by the routing optimization mode, the proxy server, for the terminal data layer to accesses the internet, will be located in a foreign agent of the current foreign network where the terminal is located, rather than a home agent in the home network. Data sending or receiving between the terminal and the internet is transferred directly through the foreign agent, as shown in FIG. 2a. Under this condition, if the terminal uses the ALTO server related to the foreign agent, the cross-domain traffic may be reduced, and it is beneficial to meet the network optimization demand of a foreign network operator. In addition, when the terminal accesses the Internet by adopting a VPN tunnel, as shown in FIG. 2c, under this condition, if the terminal uses the ALTO server 27, the cross-domain traffic may also be reduced, and it is beneficial to meet the network optimization demand of the ISP.

When the terminal moves from the home network to the foreign network, if a tunnel is established between the home agent and the foreign agent and the home agent is used as the proxy server for the terminal data layer to access the internet to transmit data, and under this condition, as shown in FIG. 2b, if the terminal uses the ALTO server related to the home agent, the cross-domain traffic may be reduced, and it is beneficial to meet the network optimization demand of a home network operator.

Figure 10:
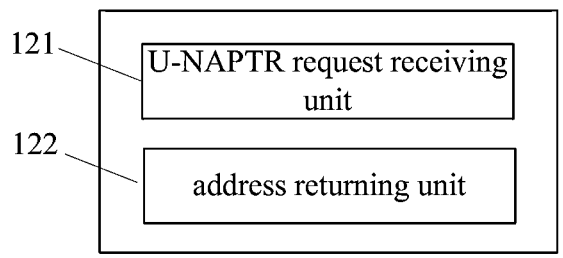
FIG. 10 is a block diagram of a DNS server provided by the embodiments of the present disclosure.

The embodiments of the present disclosure also provide a DNS server. As shown in FIG. 10, the DNS server comprises a U-NAPTR request receiving unit 121 and an address returning unit 122.

The U-NAPTR request receiving unit 121 is configured to receive a U-NAPTR request sent by a terminal, wherein the U-NAPTR request comprises a query name constructed using a domain name of a proxy server for a terminal data layer to access internet.

The address returning unit 122 is configured to return an address of an ALTO server related to the proxy server to the terminal, for the terminal to communicate with the ALTO server according to the address of the ALTO server.

Figure 11:
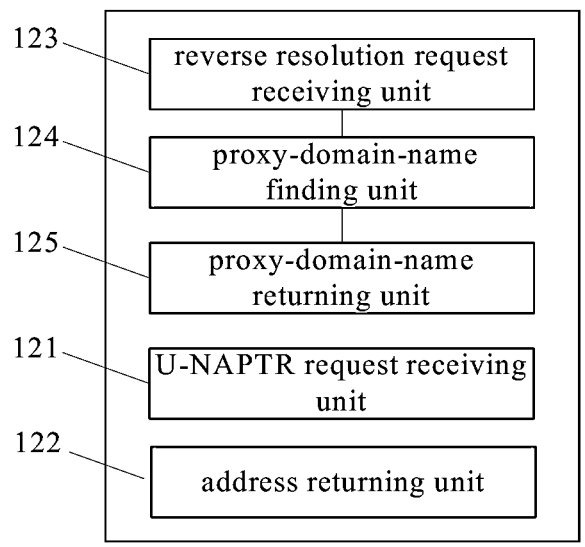
FIG. 11 is a block diagram of another DNS server provided by the embodiments of the present disclosure.

Further, as shown in FIG. 11, the DNS server further comprises a reverse resolution request receiving unit 123, a proxy-domain-name finding unit 124 and a proxy-domain-name returning unit 125.

The reverse resolution request receiving unit 123 is configured to receive a reverse resolution request initiated by the terminal before receiving the U-NAPTR request sent by the terminal, the reverse resolution request carrying an IP address of the proxy server.

The proxy domain name searching unit 124 is configured to find the domain name of the proxy server according to the IP address of the proxy server.

The proxy domain name returning unit 125 is configured to return the domain name of the proxy server to the terminal.

Figure 12:
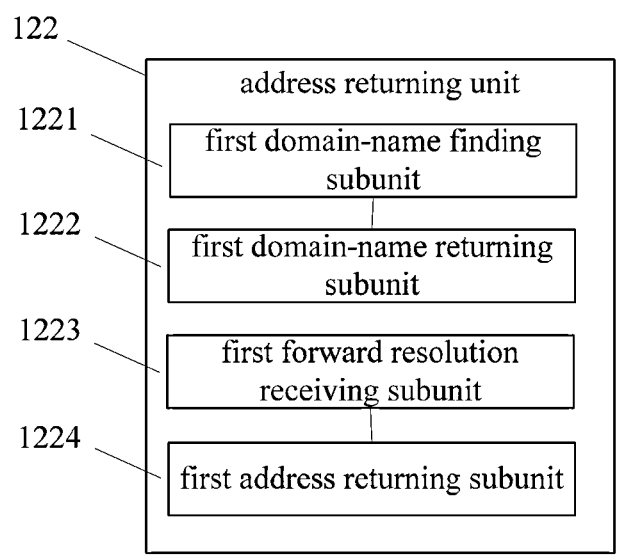
FIG. 12 is a block diagram of an address returning unit of the embodiments of the present disclosure.

Further, as shown in FIG. 12, the address returning unit 122 may specifically comprises a first domain-name finding subunit 1221, a first domain-name returning subunit 1222, a first forward resolution receiving subunit 1223 and a first address returning subunit 1224.

The first domain-name finding subunit 1221 is configured to find a domain name of the ALTO server after receiving a U-NAPTR request sent by a terminal.

The first domain-name returning subunit 1222 is configured to return the domain name of the ALTO server to the terminal.

The first forward resolution receiving subunit 1223 is configured to receive a forward resolution request initiated by the terminal, the forward resolution request comprising the domain name of the ALTO server.

The first address returning subunit 1224 is configured to find the address of the ALTO server according to the domain name of the ALTO server and return the address to the terminal.

The address of the ALTO server, returned by the DNS server, may be a URI or IP address. For the URI address returned by the DNS server, it finally needs to be converted into the corresponding IP address by the DNS server, so that the terminal may communicate with the ALTO server according to the IP address of the ALTO server.

Figure 13:
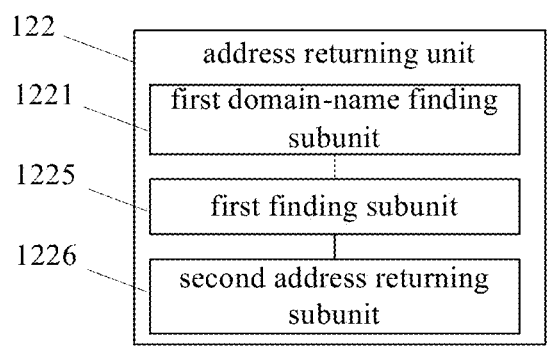
FIG. 13 is a block diagram of another address returning unit of the embodiments of the present disclosure.

Further, the address returning unit 122 may also have another structure. As shown in FIG. 13, the address returning unit 122 specifically comprises a first domain-name finding subunit 1221, a first finding subunit 1225 and a second address returning subunit 1226.

The first searching subunit 1225 is configured to find the address of the ALTO server according to the domain name of the ALTO server; and the second address returning subunit 1226 is configured to return the address of the ALTO server to the terminal along with the domain name of the ALTO server.

In the embodiment of the present disclosure, the proxy server may be a home agent of a home network, or a foreign agent of a foreign network, or a proxy server for a VPN to access the internet.

According to the terminal and the DNS provided in the embodiments of the present disclosure, the terminal communicates with the ALTO server according to the address of the ALTO server by obtaining the domain name of the proxy server for the terminal data layer to access internet and requesting the DNS server for an address of the ALTO server according to a query name constructed using the domain name of the proxy server, so as to avoid the condition that the ALTO server obtained by the terminal is not the one related to the proxy server of the terminal data layer accessing the internet, thus reducing the cross-domain traffic and facilitating the network optimization demand of the ISP.

Figure 14:
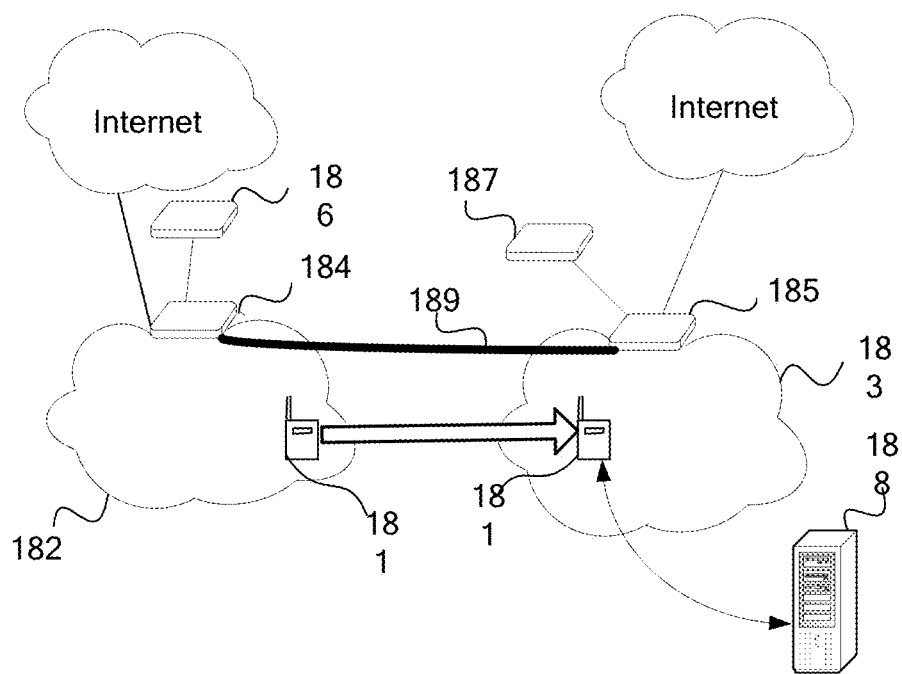
FIG. 14 is a schematic diagram of a discovery system for an application layer traffic optimization server provided by the embodiments of the present disclosure.

Moreover, the embodiments of the present disclosure also provide a discovery system for an application layer traffic optimization server. The system comprises the above-mentioned terminal and DNS. The scenario of the system is shown in FIG. 14. an terminal 181 is in a home network 182, or moves from the home network 182 to a foreign network 183. The home network 182 has a home agent 184, the foreign network 183 has a foreign agent 185, and an ALTO server 186 related to the home agent 184 and an ALTO server 187 related to the foreign agent 185 are also provided in the figure.

In a routing optimization mode of the mobile IP technology, the terminal 181 moves from the home network 182 to the foreign network 183, and is connected to the internet through the foreign agent 185. In the routing optimization mode, the ALTO server 187 may provide more complete traffic optimization service to the terminal 181 compared with the ALTO server 186. In order to be connected to the ALTO server 187, the terminal 181 communicates with a DNS server 188 to obtain the IP address of the ALTO server 187 related to the foreign agent 185; and the specific process of obtaining the IP address will not be described redundantly herein, and please refer to the above-mentioned parts of the embodiments of the present disclosure. After the IP address of the ALTO server 187 is obtained, the terminal 181 may access the ALTO server 187 and use the traffic optimization service provided by the ALTO server on a network access side, so as to better meet the network optimization demand of an ISP of the foreign network 183.

In the tunnel mode of the mobile IP technology, data between the terminal 181 and the internet is transmitted through a tunnel 189; under the condition that the terminal 181 moves to the foreign network 183, the terminal 181 is connected to the internet through the home agent 184, and the ALTO server 186 may provide more complete traffic optimization service to the terminal 181 compared with the ALTO server 187. In order to be connected to the ALTO server 186, the terminal 181 communicates with the DNS server 188 to obtain the IP address of the ALTO server 186 related to the home agent 184; and for the specific process of acquiring the IP address, please refer to the above-mentioned parts of the embodiments of the present disclosure.

Moreover, the discovery system for the application layer traffic optimization server of the embodiment of the present disclosure may also be applied to the proxy server of an internet access layer discovered in a VPN scenario, which will not be described redundantly herein.

It should be appreciated for those of ordinary skill in the art that all or a part of the processes in the above-mentioned method embodiments may be implemented with hardware associated with program instructions which may be stored in a computer readable storage medium and performs the processes in the above-mentioned method embodiments when executed. The above-mentioned storage medium includes various medium that may store program codes, including such as a ROM, a RAM, a magnetic disk, an optical disk, or the like.

The foregoing descriptions are merely some specific implementations of the invention, rather than limiting the protection scope of the invention. Any change or substitution that is readily conceived for any one skilled in the art within the technical scope disclosed by the invention shall fall into the protection scope of the invention. Therefore, the protection scope of the present disclosure shall be defined by the claims.

What is claimed is:

1. A discovery method for an application layer traffic optimization (ALTO) server, comprising:
   obtaining a domain name of a proxy server for a terminal to access the Internet;
   obtaining, according to a query name constructed using the domain name of the proxy server, an address of an ALTO server related to the proxy server from a domain name server (DNS); and
   communicating with the ALTO server based on the address of the ALTO server.

2. The method of claim 1, wherein the obtaining a domain name of a proxy server for a terminal to access the Internet comprises:
   initiating a reverse resolution request to the DNS, the reverse resolution request comprising an IP address of the proxy server, to enable the DNS server to find the domain name of the proxy server based on the IP address of the proxy server; and
   receiving the domain name of the proxy server returned by the DNS.

3. The method of claim 2, wherein obtaining, according to a query name constructed using the domain name of the proxy server, an address of an ALTO server related to the proxy server from a domain name server DNS comprises:
   initiating, according to the query name constructed using the domain name of the proxy server, a URL-enabled naming authority pointer (U-NAPTR) request to the DNS server, to enable the DNS server to find a domain name of the ALTO server related to the proxy server based on the domain name of the proxy server;
   receiving the domain name of the ALTO server returned by the DNS server;
   initiating a forward resolution request to the DNS server, the forward resolution request comprising the domain name of the ALTO server, to enable the DNS server to find the address of the ALTO server according to the domain name of the ALTO server; and
   receiving the address of the ALTO server returned by the DNS server.

4. The method of according to claim 3, wherein the proxy server is a home agent of a home network, or a foreign agent of a foreign network, or a proxy server for a VPN to access the internet.

5. The method of claim 2, wherein obtaining, according to a query name constructed using the domain name of the proxy server, an address of an ALTO server related to the proxy server from a domain name server DNS comprises:
   initiating a URL-enabled naming authority pointer (U-NAPTR) request to the DNS server according to the query name constructed using the domain name of the proxy server, to enable the DNS server to find a domain name of the ALTO server based on the domain name of the proxy server; and
   receiving the domain name of the ALTO server and address of the ALTO server returned by the DNS server.

6. The method of according to claim 2, wherein the proxy server is a home agent of a home network, or a foreign agent of a foreign network, or a proxy server for a VPN to access the internet.

7. The method of claim 1, wherein obtaining, according to a query name constructed using the domain name of the proxy server, an address of an ALTO server related to the proxy server from a domain name server DNS comprises:
   initiating, according to the query name constructed using the domain name of the proxy server, a URL-enabled naming authority pointer (U-NAPTR) request to the DNS server, to enable the DNS server to find a domain name of the ALTO server related to the proxy server based on the domain name of the proxy server;
   receiving the domain name of the ALTO server returned by the DNS server;
   initiating a forward resolution request to the DNS server, the forward resolution request comprising the domain name of the ALTO server, to enable the DNS server to find the address of the ALTO server based on the domain name of the ALTO server; and
   receiving the address of the ALTO server returned by the DNS server.

8. The method of according to claim 7, wherein the proxy server is a home agent of a home network, or a foreign agent of a foreign network, or a proxy server for a VPN to access the internet.

9. The method of claim 1, wherein obtaining, according to a query name constructed using the domain name of the proxy server, an address of an ALTO server related to the proxy server from a domain name server DNS comprises:
   initiating a URL-enabled naming authority pointer (U-NAPTR) request to the DNS server according to the query name constructed using the domain name of the proxy server, to enable the DNS server to find a domain name of the ALTO server based on the domain name of the proxy server; and
   receiving the domain name of the ALTO server and address of the ALTO server returned by the DNS server.

10. The method of according to claim 1, wherein the proxy server is a home agent of a home network, or a foreign agent of a foreign network, or a proxy server for a VPN to access the internet.

11. A terminal, comprising:
    a processor; and a non-transitory computer readable storage medium storing a program for execution by the processor, the program including instructions to:

obtain a domain name of a proxy server for a terminal to access the Internet;

obtain, according to a query name constructed using the domain name of the proxy server, an address of an application layer traffic optimization (ALTO) server related to the proxy server from a domain name server (DNS); and communicate with the ALTO server based on the address of the ALTO server.

12. The terminal of claim 11, wherein the program further includes instructions to:

initiate a reverse resolution request to the DNS, the reverse resolution request comprising an IP address of the proxy server, to enable the DNS server to find the domain name of the proxy server based on the IP address of the proxy server; and receive the domain name of the proxy server returned by the DNS server.

13. The terminal of claim 12, wherein the proxy server is a home agent of a home network, or a foreign agent of a foreign network, or a proxy server for a VPN to access the internet.

14. The terminal of claim 11, wherein the program further includes instructions to:

initiate, according to the query name constructed using the domain name of the proxy server, a URL-enabled naming authority pointer (U-NAPTR) request to the DNS server, to enable the DNS server to find a domain name of the ALTO server related to the proxy server based on the domain name of the proxy server;

receive the domain name of the ALTO server related to the proxy server, which is returned by the DNS server;

initiate a forward resolution request to the DNS server, the forward resolution request comprising the domain name of the ALTO server, to enable the DNS server to find the address of the ALTO server based on the domain name of the ALTO server; and receive the address of the ALTO server returned by the DNS server.

15. The terminal of claim 11, wherein the program further includes instructions to:

initiate a URL-enabled naming authority pointer (U-NAPTR) request to the DNS server according to the query name constructed using the domain name of the proxy server, to enable the DNS server to find a domain name of the ALTO server based on the domain name of the proxy server; and receive the domain name of the ALTO server and address of the ALTO server returned by the DNS server.

16. A DNS server, comprising:

a processor; and a non-transitory computer readable storage medium storing a program for execution by the processor, the program including instructions to:

receive a URL-enabled naming authority pointer (U-NAPTR) request sent by a terminal, wherein the U-NAPTR request comprises a query name constructed using a domain name of a proxy server for a terminal to access internet; and return an address of an application layer traffic optimization (ALTO) server related to the proxy server to the terminal, to enable the terminal to communicate with the ALTO server according to the address of the ALTO server.

17. The server of claim 16, wherein the program further includes instructions to:

receive a reverse resolution request initiated by the terminal before receiving the U-NAPTR request sent by the terminal, the reverse resolution request carrying an IP address of the proxy server;

find the domain name of the proxy server according to the IP address of the proxy server; and return the domain name of the proxy server to the terminal.

18. The server of claim 16, wherein the program further includes instructions to:

find a domain name of the ALTO server after receiving a U-NAPTR request sent by a terminal;

return the domain name of the ALTO server to the terminal;

receive a forward resolution request initiated by the terminal, the forward resolution request comprising the domain name of the ALTO server; and find the address of the ALTO server according to the domain name of the ALTO server and return the address to the terminal.

19. The server of claim 16, wherein the program further includes instructions to:

find the domain name of the ALTO server;

find the address of an ALTO server according to the domain name of the ALTO server; and return the address of the ALTO server and domain name of the ALTO server to the terminal.

20. The server of claim 16, wherein the proxy server is a home agent of a home network, or a foreign agent of a foreign network, or a proxy server for a VPN to access the internet.

* * * * *